United States Patent [19]

Walter

[11] 4,203,320
[45] May 20, 1980

[54] TESTING APPARATUS FOR MULTIPLE COPY FORM SETS

[75] Inventor: Alfred Walter, Schlieren, Switzerland

[73] Assignee: Alfred Walter AG, Schliern, Switzerland

[21] Appl. No.: 32,237

[22] Filed: Apr. 23, 1979

[30] Foreign Application Priority Data

May 3, 1978 [CH] Switzerland .......................... 4852/78

[51] Int. Cl.² ..................... G01M 19/00; G01N 33/00
[52] U.S. Cl. ..................................... 73/150 R; 73/159
[58] Field of Search ............................ 73/159, 150, 14

[56] References Cited

U.S. PATENT DOCUMENTS

| | | | |
|---|---|---|---|
| 2,300,107 | 10/1942 | Curado | 73/150 |
| 2,488,869 | 11/1949 | Keenan | 73/150 |
| 4,122,702 | 10/1978 | Walter | 73/14 |

Primary Examiner—S. Clement Swisher
Attorney, Agent, or Firm—Fitch, Even & Tabin

[57] ABSTRACT

Apparatus for testing the fitness of the multiple copy sets for handwritten copies. The form set to be tested is placed on an inclined supporting plate and is clamped to the supporting plate by a slotted hold down plate. A writing instrument, which includes a spring loaded writing implement, is carried by a carriage so that the tip of the writing implement contacts the form set through the slot. The carriage is movable so as to move the tip of the writing instrument along the slot. The writing implement is supported so that the tip contacts the form set substantially without pressure in a starting position. As the carriage is shifted in the direction of increasing ascent of the supporting plate the bearing pressure of the tip of the writing implement increases as a function of the path of travel. The test line produced on the different sheets of the set is a measure of the quality of the copies.

5 Claims, 6 Drawing Figures

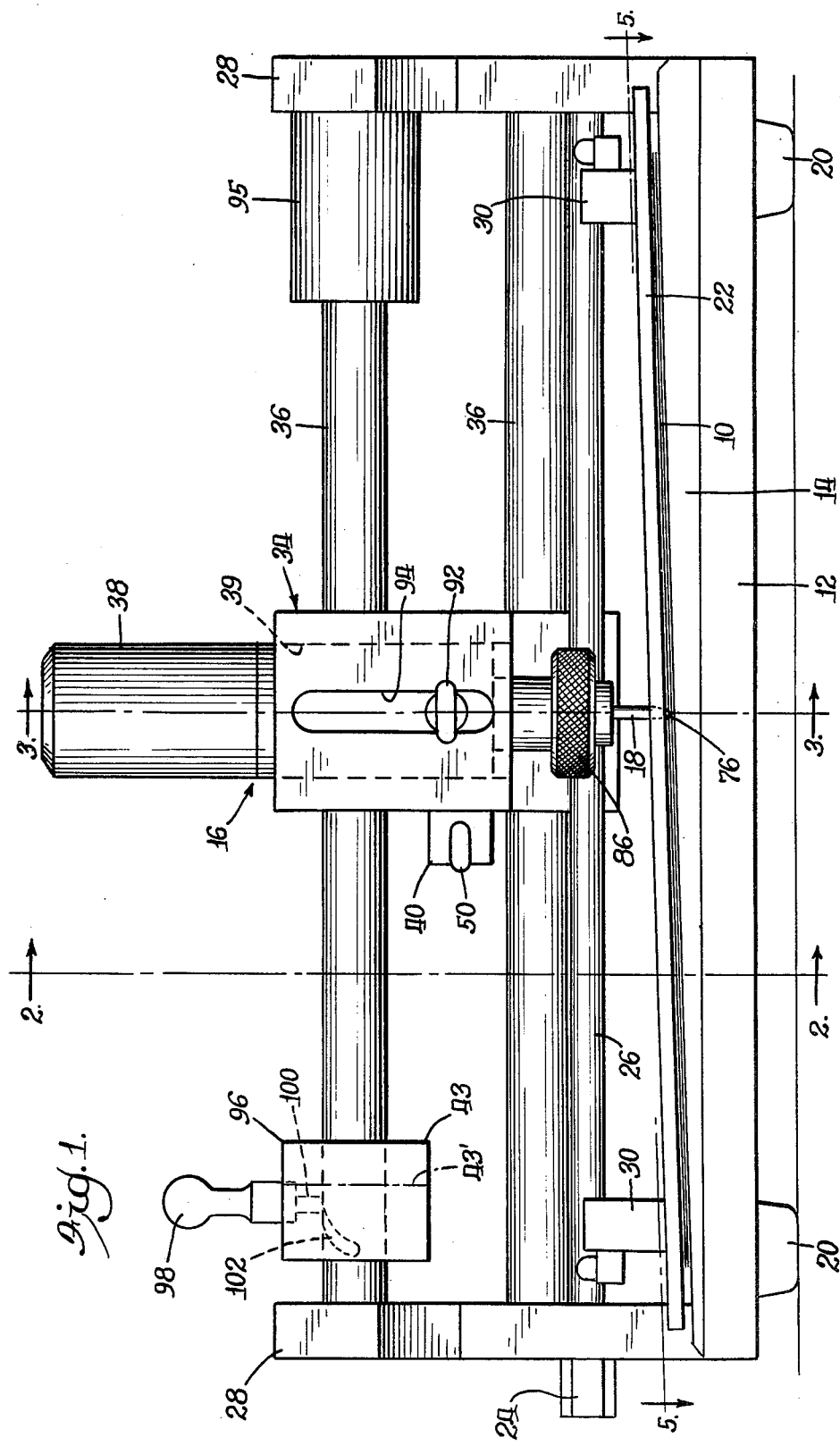

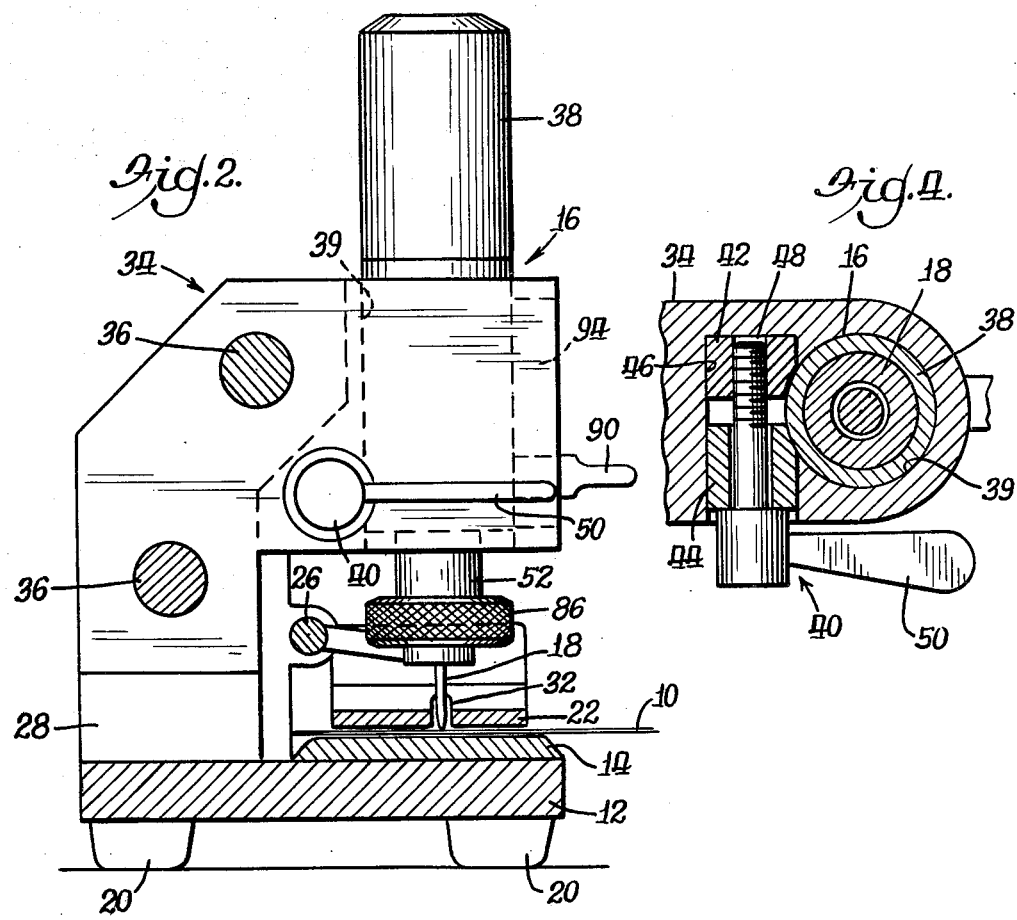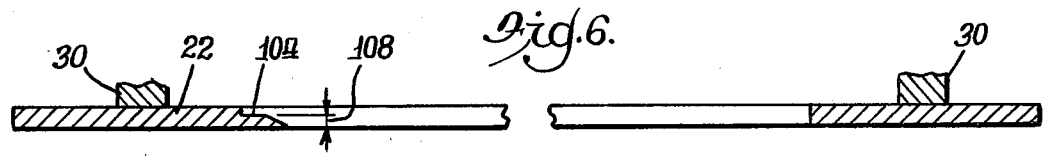

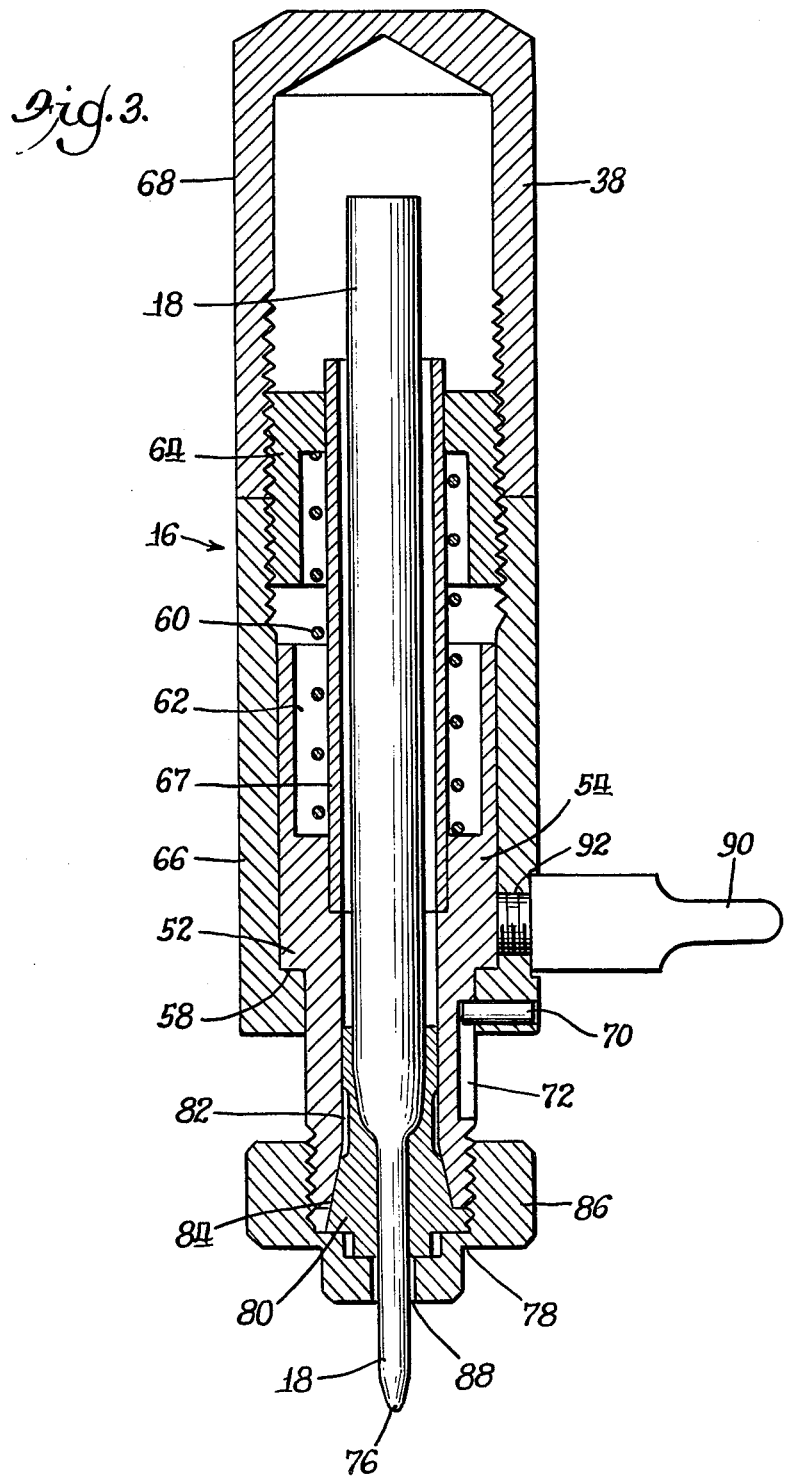

TESTING APPARATUS FOR MULTIPLE COPY FORM SETS

The present invention relates to testing apparatus and more particularly to apparatus for testing a multiple copy form set for write through quality.

In offices, or in other places of business, multiple copy form sets are employed for handwritten correspondence. Such a form set includes multiple sheets of paper with copying papers or surfaces therebetween. It is desirable in such form sets to have a high quality of copying (write through quality) so that the handwriting on the last copy is legible. The write through quality may be controlled by varying the pressure of writing or by the use of different copying paper or surfaces. Previously, the copying paper or surfaces has been selected mostly in an empiric way. This was imprecise and led to undesirable differences in write through quality and loss of legibility.

An object of the present invention is to provide an apparatus for testing multiple copy form sets for write through quality. Another object of the invention is to provide a testing apparatus for testing multiple copy form sets for write through quality which apparatus is easy to use and inexpensive to manufacture.

Other objects and advantages of the present invention will become apparent by reference to the following description and accompanying drawings wherein:

FIG. 1 is a front view of a testing apparatus for multiple copy sets built in accordance with the present invention;

FIG. 2 is a cross sectional view taken along line 2—2 of FIG. 1;

FIG. 3 is an enlarged sectional view of the writing instrument taken along line 3—3 of FIG. 1;

FIG. 4 is a cross sectional view of the means for locking the writing instrument on the carriage, taken generally along line 4—4 of FIG. 2;

FIG. 5 is a reduced cross sectional view of the hold down plate of FIG. 1; and

FIG. 6 is a cross sectional view taken generally along the line 6—6 of FIG. 5.

Generally, in accordance with the present invention, a testing apparatus is provided for testing the write through quality of a form set 10. As shown in the drawings, the apparatus comprises a horizontal base plate 12 having mounted thereon a supporting plate 14 for the form set 10. The supporting plate 14 is inclined with respect to the vertical. A writing instrument 16 is mounted above the base plate 12 so as to be movable in the direction of inclination of the supporting plate 14. The writing instrument 16 includes a writing implement 18 which is biased vertically toward the supporting plate 14, whereby the bearing pressure of the writing implement 18 contacting the form set 10 draws a line on the form set 10 as the writing instrument 16 is moved in the direction of inclination, which line is variable in intensity.

More particularly, as shown in FIGS. 1 and 2, the testing apparatus includes the base plate 12 which is in the form of a generally rectangular plate and is provided with four foot pads 20, one attached to each corner of the plate. The supporting plate 14 upon which the multiple copy set 10 to be inspected is placed, is suitably attached to the upper surface of the front portion of the base plate 12. The supporting plate 14 is generally rectangular horizontally and its vertical cross section is such that its upper surface is inclined in the longitudinal direction, whereby, as shown in FIG. 1, the right end of the surface of the supporting plate 14 is higher than the left end.

The multiple copy form set 10 to be inspected is disposed on the supporting plate 14 and is retained thereon by an elongated and planar hold down plate 22 which also removes air from the set. Means are provided for pivoting the hold down plate 22 upward away from the form set. The pivoting means includes a lever 24 connected to one end of a horizontally extending rod 26 which is journaled at each end in side plates 28 attached to the rear portions of the ends of the base plate 12. The rod 26 is connected to each end of the hold down plate 22 by a lever 30. A longitudinally extending, elongated slot 32 is provided in the hold down plate 22 to expose a longitudinal portion of the upper surface of the multiple form set 10.

As shown particularly in FIGS. 1 and 2, the writing instrument 16 is held in its vertical position with the tip of the writing implement 18 in register with the slot 32 by a carriage 34. The carriage 34 is mounted for sideways movement on two parallel guide rods 36 which extend between and are attached to the two side plates 28 and position the carriage so that its movement is such that the tip of the writing implement 18 moves along to slot 32.

As shown particularly in FIGS. 1 to 4, the writing instrument 16 includes a two-piece, generally cylindrical outer shell 38 which is received for vertical movement within a vertically extending hole 39 in the carriage. The cylindrical shell 38 is locked in a vertical position by a locking means 40. The locking means 40 includes a movable inner clamping jaw 42 and a fixed outer clamping jaw 44 both of which are disposed within a horizontal recess 46 in the carriage 34. The clamping jaws 42 and 44 are interconnected by a bolt 48 which is threadedily engaged at its inner end with the inner jaw 42 and extends through an aperture in the outer jaw 44. A lever 50 is provided on the outer end of the bolt 48, where by turning the lever 50 the inner clamping jaw 42 is moved outward so that the edge thereof bears against the shell 38 to lock the shell 38 vertically within the carriage 34.

As shown particularly in FIG. 3, the writing instrument 16 includes a holding means 52 for the writing implement 18. The holding means includes a piston 54, the upper generally cylindrical portion of which is disposed for vertical movement within the hollow interior of the cylindrical shell 38. The lower portion of the piston 54 is reduced in diameter and passes through an aperture 56 in the lower wall of the cylindrical shell 38. A shoulder 58 disposed between the lower reduced portion and the upper portion of the piston bears against the lower wall of the shell 38 to serve as a means for limiting downward movement of the piston 54. The piston 54 is biased downward by a spring 60 which is received in a recess 62 in the upper surface of the piston 54. The upper end of the spring 60 is retained within an inverted cup 64 which is threadedily received in the lower section 66 of the shell 38. The spring 60 is guided in its movement by a tubular sleeve 67 disposed within the spring and attached at its lower end to the piston 52. By rotating the cup 64 the spring-bias may be changed. The upper section 68 of the shell 38 is held in position by screwing it onto the threaded cup 64.

Upward movement of the piston 54 is limited by a pin 70 retained in the lower end of the shell 38 and extending into a vertical slot 72 in the piston 54.

The writing implement 18, which as illustrated is a ball-point nib, extends through an axially extending hole 74 in the piston 52. The writing implement 18 is positioned so its writing tip 76 protrudes from the bottom of the piston 54 and is held within the piston 54 by a clamping means 78. The clamping means 78 includes a clamped member 80 having vertical slots 82 to permit its central aperture to be reduced and thereby grip the writing implement 18. The clamping member 80 is provided with a conical outer surface 84 which cooperates with a flared opening in the lower end of the piston 54. The clamping member 80 is forced into the flared opening by a knurled knob 86 which is threadedily engaged with the lower end of the piston 54 and bears against the lower end of the clamping member 80. The knurled knob 86 is provided with an axial opening 88 to permit the writing implement 18 to extend therethrough.

A horizontally extending lever 90 is screwed into a threaded opening 92 in the shell 38 which lever is received in a vertically extending slot 94 in the front of the carriage. The lever is used for lifting the writing implement 16 and also for providing a means for moving the carriage 34 sideways.

As shown in FIG. 1, a stop 95 for the carriage 34 in the form of a tubular block is attached to the right-hand side plate 28 and is disposed about the upper guide rod 36. An adjustable stop 96 is provided for limiting the movement of the carriage toward the left of the apparatus. The adjustable stop 96 includes a tubular member disposed upon the upper guide rod 36. The tubular member is provided with a positioning lever 98 which includes a cylindrical inner portion 100 which is received in a spiral groove 102 in the upper guide rod 36. Thus, by rotating the stop 96, it can be moved along the rod a short distance, for the purpose of calibrating the apparatus with respect to the thickness of the multiple form set to be tested.

As illustrated in FIGS. 5 and 6, the calibrating means includes a recessed gauging surface 104 disposed at the left-hand end of the slot 32 of the hold down plate 22, which surface extends parallel to the upper surface of the hold down plate 22. When the adjustable stop 96 is in its left most position 106 and the carriage is against the stop 96, the tip 76 of the writing implement 18 is in register with the gauging surface 104. The calibrating surface is connected to the lower surface of the hold down plate by a ramp 106 to permit gradual engagement of the tip 76 of the writing implement 18 with the surface of the form set 10.

In operation, the hold down plate 22 is pivoted upwardly and the form set 10 is placed on supporting plate 14. The hold down plate 22 is then lowered. The apparatus is then calibrated with respect to the thickness of the form set by moving the position lever 98 of the left stop 96 downward on the guide rod 36 in order to move the left stop 96 from its right or zero position to a calibrating position, which in one embodiment is approximately 8 mm to the left of the zero position. The carriage 34 is then moved against the left stop 96 and in this position, the writing tip 76 is positioned above the calibrating surface 104. The locking means 40 for the writing instrument 16 is then opened and the writing instrument 18 is manually lowered so that it gently rests on the calibrating surface. The locking means 40 is then tightened firmly. The distance 108 of the calibrating surface 104 from the bottom surface of the hold down plate 22 is selected to correspond to a spring movement which compensates for the weight of the piston 52. Thus, when the carriage 34 is moved to the right to its zero position, the writing tip 76 rests upon the form set substantially without pressure. The carriage 34 is then moved from left to right by manually engaging the lever 90 connected to the carriage 34 as far as the right stop. The writing tip 76 thus draws, with a constantly increasing pressure, a straight line on the forms set 76. The final value may be 3.6 N, for example, at a stroke length of 12 cm. If desired, the printing ranges from zero to 3.6 N could be plotted on a scale 110 adjacent to the longitudinal measuring rod. The value of 3.6 N corresponds approximately to the highest pressure which ordinarily can be achieved in handwriting. Upon termination of the test, the hold down plate 22 is raised and the sample set 10 is removed. The apparatus need not be recalibrated for testing of additional form sets unless form sets of different thicknesses are used.

In one embodiment, a spring with a resilient force of 0.192 kg per mm is provided. Based upon this spring constant and the desired distribution of the pressure from zero to 3.6 N over a carriage movement of 12 cm, both the thickness 106 of the calibration surface and the ascent of the supporting plate 14 may be determined.

The disclosed apparatus permits one to compare the copying quality of different sets of forms in order to determine their appropriateness for handwritten copies. The apparatus also is useable to permit quality control measurements on the copying papers and carbon papers as supplied with respect to their coating quality. In addition, the apparatus is useable for regular production control in the fabrication of multiple copy form sets in order to be able to determine, for example, changes in the paper structure.

Various changes and modifications may be made on the above described testing apparatus without deviating from the spirit or scope of the present invention. For example, instead of employing a ball-point nib, a moving wheel or a lead may be employed. Various features of the invention are set forth in the accompanying claims.

I claim:

1. A testing apparatus for multiple copy form sets comprising a supporting plate for supporting on its upper surface a form set to be tested, a carriage movably disposed above said supporting plate so as to be displaceable along a path of movement, said path of movement being inclined with respect to the surface of said supporting plate, a writing instrument carried by said carriage and including a writing implement movable perpendicularly to said surface, means for biasing said writing implement toward said surface so as to cause the writing implement to contact the form set, whereby movement of the carriage in the direction of reduced distance between said surface and said path of movement causes a line to be drawn upon the form set which is variable as a result of the reduced distance.

2. An apparatus in accordance with claim 1 wherein the upper surface of the supporting plate is inclined with respect to the horizontal and the path of movement of the carriage is horizontal.

3. An apparatus in accordance with either claim 1 or 2 wherein the writing instrument includes a cylindrical shell and a holding means for said writing implement which is biased with respect to said shell by said biasing means, said cylindrical shell being movable with respect to the carriage and perpendicularly to said surface, and means for locking the cylindrical shell in a preselected position with respect to the carriage.

4. An apparatus in accordance with claim 3 wherein a hold down plate is provided for clamping the form set against the surface of the supporting plate, said hold down plate being provided with a slot extending parallel to the path of movement of the writing implement thereby permitting the writing implement to contact the surface of the form set.

5. An apparatus in accordance with claim 4 wherein a movable stop is provided for the carriage which is movable from a calibrating position to a zero position and a calibrating surface is provided on the hold down plate whereby when the stop is in the calibrating position and the carriage is against the stop the tip of the writing implement is resting on the calibrating surface, the calibrating surface being spaced above the surface of the form set a sufficient distance to compensate for the weight of the holding means and whereby when the stop is in its zero position and the carriage is against the stop the tip of the writing instrument rests upon the form set without pressure.

* * * * *